Figure 4:
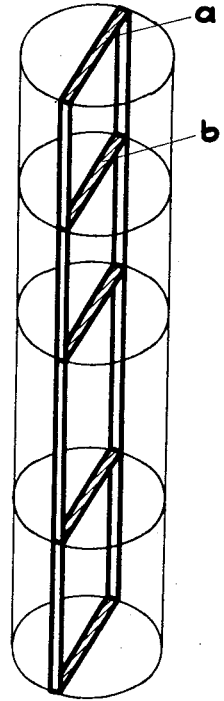

Dec. 15, 1953     O. DORSCHNER ET AL     2,662,911
TEMPERATURE CONTROL IN THE CATALYTIC
HYDROGENATION OF CARBON MONOXIDE
Filed June 8, 1949     6 Sheets—Sheet 1
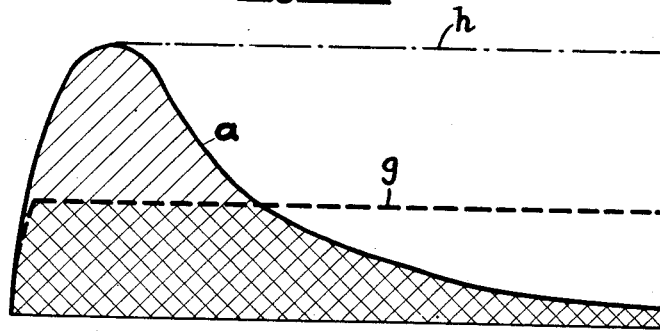
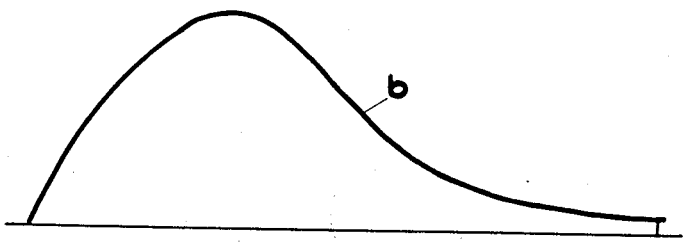
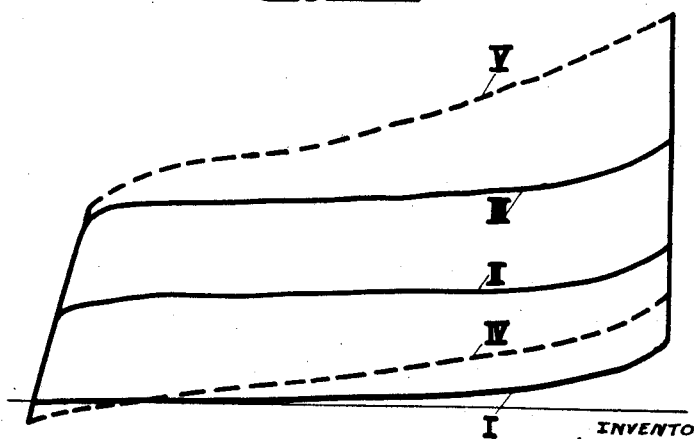
INVENTORS
Oskar Dorschner
Wilhelm Wenzel
Hans Georg Kayser
By Bailey, Stephens & Huettig
ATTORNEYS Dec. 15, 1953     O. DORSCHNER ET AL     2,662,911
TEMPERATURE CONTROL IN THE CATALYTIC
HYDROGENATION OF CARBON MONOXIDE Filed June 8, 1949     6 Sheets-Sheet 2

INVENTORS
Oskar Dorschner
Wilhelm Wenzel
Hans Georg Kayser

By Bailey, Stephens & Huettig
ATTORNEYS

Dec. 15, 1953  O. DORSCHNER ET AL  2,662,911
TEMPERATURE CONTROL IN THE CATALYTIC
HYDROGENATION OF CARBON MONOXIDE
Filed June 8, 1949  6 Sheets-Sheet 3

INVENTORS
Oskar Dorschner
Wilhelm Wenzel
Hans Georg Kayser

By Bailey, Stephens & Huettig
ATTORNEYS

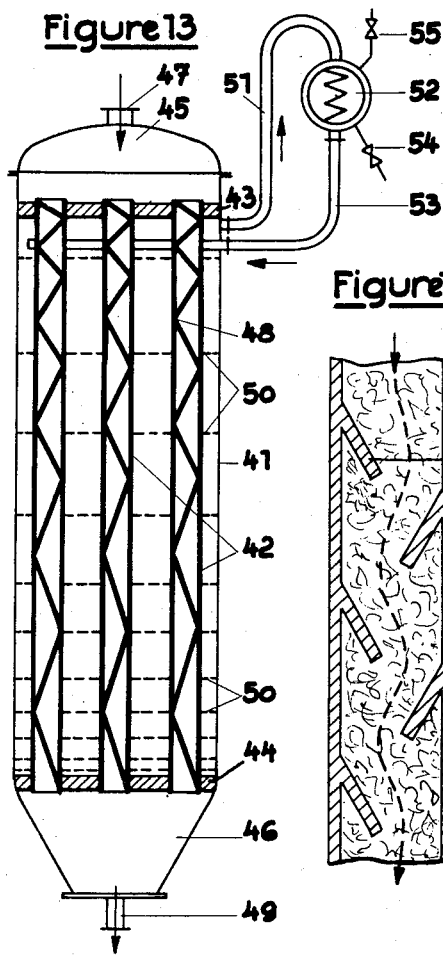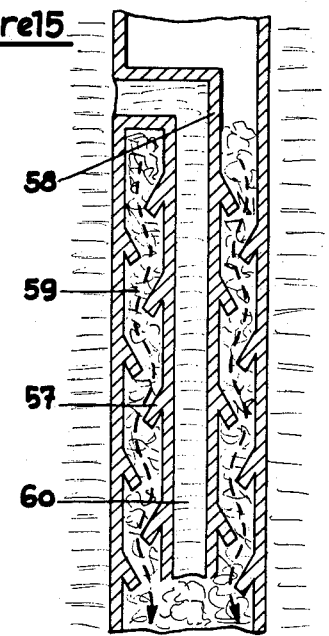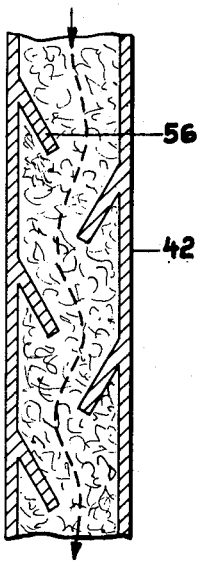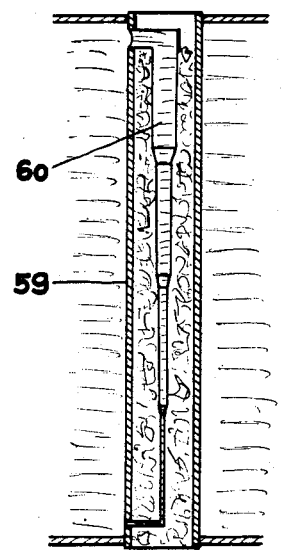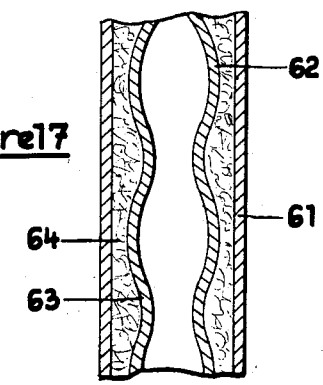

Dec. 15, 1953     O. DORSCHNER ET AL     2,662,911
TEMPERATURE CONTROL IN THE CATALYTIC
HYDROGENATION OF CARBON MONOXIDE

Filed June 8, 1949     6 Sheets-Sheet 6

INVENTORS
Oskar Dorschner
Wilhelm Wenzel
Hans Georg Kayser
By Bailey, Stephens & Huettig
ATTORNEYS Patented Dec. 15, 1953

2,662,911

UNITED STATES PATENT OFFICE 2,662,911

TEMPERATURE CONTROL IN THE CATALYTIC HYDROGENATION OF CARBON MONOXIDE

Oskar Dorschner, Bad Homburg vor der Höhe, Wilhelm Wenzel, Frankfurt am Main, and Hans Georg Kayser, Frankfurt am Main Eschersheim, Germany, assignors to Metallgesellschaft Aktiengesellschaft, Frankfurt am Main, Germany, a corporation of Germany Application June 8, 1949, Serial No. 97,842

Claims priority, application Germany October 1, 1948

13 Claims. (Cl. 260—449)

This invention relates to a process and apparatus for carrying out chemical reactions.

When carrying out chemical reactions, large amounts of heat are frequently set free. This may often, particularly in the case of continuous processes, involve certain difficulties, which will result for instance in the reactions remaining incomplete or taking an undesired course. Furthermore, in the case of catalytic reactions, the catalysts may be heavily damaged under the influence of too much heat.

It is, therefore, tried to remove continuously and possibly utilize the heat set free by the reaction. Thus, when performing catalytic reactions in the gaseous phase, for whose course a narrow temperature range is desirable or necessary, the catalyst is arranged between heat-exchanging surfaces in such a way as to transfer, by indirect heat exchange, the heat of reaction, or a major portion of it, to a cooling medium, e. g. a cooling liquid, particularly cooling-water. For catalytic hydrogenation of carbon monoxide to hydrocarbons of higher molecular weight or the like at atmospheric or slightly increased pressure, lamellar reactors are used, in which the catalyst fills the interstices between numerous vertical sheets (lamellas), being spaced 7–10 mm. one from the other, and run through by horizontal cooling tubes. The latter contain water boiling under pressure which serves as cooling medium. The heat of reaction is transferred to the cooling water by means of the sheets and the tube walls, and vaporizes part of the water. The steam produced in the tubes passes to a steam collector.

When operating this synthesis at increased pressure, the catalyst will be arranged in a fixed bed in the annular space between two telescoped tubes. A large number of such telescoped tubes are housed in a pressure vessel. The space between inner and outer tubes is also, as with the sheets, 7–10 mm. only. The exterior side of the outer tube and the interior side of the inner tube are cooled by water boiling under pressure. In both types of reactors, the gases pass the catalyst from top to bottom of the reactor. With such reactors, a sufficient removal of heat of reaction had hitherto been possible only when the catalyst was applied in thin layers. This resulted in expensive reactor designs. In particular, large amounts of iron were required for the construction of the reactors. Such problems of heat exchange and reactor design may be encountered also with many other continuously operated exothermic or endothermic chemical reactions.

The velocity of a chemical reaction decreases with increasing conversion of the reacting substances into the desired end-product. With catalytic reactions in the gaseous phase, for instance, the conversion of the gas mixture passing the catalyst is most intense at the entrance of the reactor where the gases first contact the catalyst, which usually is arranged in extended layers; the conversion diminishes with the gas further flowing through the catalyst. Accordingly, the conversion achieved as a whole is not distributed evenly along the gas passage in the reactor. It will rather follow a course which, when plotted diagrammatically as a curve, shows a steep rise, quickly reaches a maximum and then immediately declines. This decline is steep at the beginning, and then gradually flattens (curve $a$, Fig. 1). This means that the portions of catalyst which are located at the gas feed side of the reactor, will effect by far the greater percentage of the conversion, whereas the portions more remote from the feed side scarcely contribute to an increase of the conversion. The causes are the following: The temperature of the cooling medium is so adjusted that the gas entering the catalyst will encounter optimum reaction conditions and that, for instance, with synthesis of higher hydrocarbons or the like, maximum yields will be obtained and little methane will be formed. Thus the temperature is strictly limited to a narrow range. The cooling medium having about the same temperature all through the reactor, the reaction velocity will decrease with the concentration of the reacting gases decreasing during the passage of the gas through the catalyst. During the last stretch of gas passage, the reaction nearly comes to a standstill.

To the above described conversion-curve ($a$, as per Fig. 1), there corresponds a tempeature-curve which quickly rises above the temperature of the cooling medium, then first steeply drops, and in its further trend asymptotically approaches the constant temperature of the cooling medium (curve b as per Fig. 2). If the conversion were to be increased, conversion curve and temperature curve would show sharper maxima still. The peak temperature, in this case, will soon rise so high that the catalyst will foul and quickly be spent. If, therefore, the curves of both the conversion and the catalyst temperature, are to take the trend as described above, a certain percentage of conversion cannot be exceeded.

The height of the reactors for hydrocarbon synthesis by hydrogenation of carbon monoxide is known to be about 2.5–4.5 m. It has been suggested for this and similar purposes to make the tubes containing the catalyst more than 5 m., e. g. up to 10 m. high. It was expected that due to the higher hydrostatic pressure the cooling medium would then boil at a higher temperature in the lower part of the cooling space than in its upper part, and that the conversion in the lower regions of the catalyst layers would increase accordingly. Since, however, the cooling space contains both cooling medium liquid and vapor, the mixture of which has a substantially lower specific weight than the liquid, the hydrostatic pressure in the lower part of the cooling space, even with catalyst layers of 10 m. height, is not so high that the increase in boiling temperature encountered here will exert any essential influence on the course of the reaction on the catalyst, even provided that higher boiling cooling mediums, such as glycerine, diphenyl or paraffin oil are used. Moreover a certain circulation of the cooling medium will take place in the cooling space in a vertical direction, which also adds to level the temperature differences between upper and lower part of the cooling space. A similar effect is exerted by the vapors rising from the lower part of the cooling space, because it takes some time till a balance is reached between the temperature of the rising vapors and that of the cooling medium. Accordingly, differences in temperature between the upper and lower parts of the cooling space of not more than 5° C. could be obtained when such high reactors were used, even if particularly favorable cooling mediums were used, such as diphenyl, paraffin oil and the like. Also this principally known working method, therefore, will not effect an approximate uniformity of the reaction velocity and the conversion all through the catalyst bed.

Use of high catalyst layers made it possible to pass the reaction gases through the catalyst at higher speed than is feasible with lower catalyst layers, at equal time of retention of the gases in the reactor, and thus to effect a more rapid transfer of the reaction heat to cooling surfaces and cooling medium. However, such more effective cooling of the reacting substances and the catalyst also extended to the lower portions of the latter, so that the reaction temperatures in these portions were not raised, but actually lowered and the conversion did not increase but decrease. The pursued aim to load the catalyst more uniformly could thus not be reached also for this reason. Moreover, high catalyst layers of e. g. about 10 m. height were hitherto not recommendable for all cases. When using such high layers it was for instance difficult to fill the catalyst into the reactor and to remove spent catalyst from it, because hitherto, it was necessary for the hydrogenation of carbon monoxides to keep the horizontal width of the catalyst layers small, e. g. 9 mm.

By the invention, the removal or the introduction of the reaction heat of continuously operated chemical reactions can be substantially improved; in particular, there can be obtained higher conversions or yields or both and the reaction space can be utilized better. According to this invention, chemical reactions, especially those wherein large amounts of heat are set free or consumed, for example catalytic reactions of gases, are carried out in such a way that the reaction space, through which the reacting substances or a portion of same are passed continuously, are cooled or heated by means of a boiling liquid medium in such a way that the difference between the temperature of the liquid medium at the entrance side of the reacting substances into the reaction space, and the temperature of the liquid medium at their exit side, is greater than the difference caused by the hydrostatic pressure of the liquid medium in the temperatures between the boiling liquid medium in the lower and in the upper part of the installation containing the liquid medium.

The aim according to this invention can be reached, for instance, by using as a cooling medium a mixture of two or several liquid mediums, when the reaction space is to be cooled, the components in this mixture having different boiling points, by carrying out the partial evaporation of the mixture in the cooling space of the reaction vessel in the manner of a rectifying distillation, and by condensing the vapors and adding the condensate to the cooling medium in the upper part of the cooling space. To bring about the rectifying evaporation of the cooling medium the cooling space may be filled to a greater or lesser extent, with e. g. Raschig rings, spiral trickling elements, balls or other filling bodies. Furthermore, a suitable number of sieves, punched sheets or similar installations may be arranged in the cooling space properly spaced one from the other, if necessary even in combination with the above filling bodies. In many cases, the cooling space may be developed like a rectifying column.

By the boiling process in the cooling space, preferably the lighter boiling components of the cooling mixture are vaporized, and the concentration of the mixture is changed in such a way that the lower boiling constituents will be enriched in the upper, and the higher boiling constituents in the lower part of the cooling space. Accordingly, the boiling temperature of the cooling medium in the lower part of the cooling space will be higher than that of the cooling medium in the upper part of the cooling space. Consequently, also the temperature in the lower part of the reaction space will be higher than in its upper part. By properly selecting the components of the cooling mixture, as well as by a proper selection and arrangement of the installations or filling bodies etc., any desired drop of temperature between the lowest and uppermost parts of the cooling space, and thus of the reaction space, can be obtained. On the other hand, the course of the temperature change in the reaction space can be influenced, for instance the reaction temperature can be made to rise from the top to the bottom first in flatter and then in a steeper curve. When the reacting substances or a portion of them flow from top to bottom through the reaction space, the temperatures along the reaction way can be so adjusted that they will throughout correspond to the increase of the optimum reaction temperature, which depends on the change in the concentration of the reacting substances.

The mixture of liquid or molten substances of different boiling points, being used as cooling medium, may also be continuously or periodically introduced into the cooling space, e. g. at about the medium height of the latter, in which case the lighter boiling constituents of the liquid mixture are withdrawn from the top of the cooling space in vaporous form, the higher boiling constituents being withdrawn from its bottom in liquid form.

If proceeding in such a way that the liquid remains in the cooling space constantly or for a longer period, that furthermore the vaporizing constituents of the cooling medium are liquefied e. g. by utilizing the heat of condensation, in a conventional manner (either while still in the upper part of the cooling space or outside of it), and that the condensate is recycled to the liquid mixture in the cooling space, the continous reflux of the condensate, enriched with lighter boiling constituents, will also substantially contribute to keep the temperature lower in the upper part of the reaction space than in its lower parts.

Provided a sufficient amount of heat is set free by the reaction and sufficient quantities of the lower boiling components of the cooling medium are evaporated and refluxed, there may be no need to insert any installations, filling bodies or other such devices in the cooling space, if the cooling mixture and its boiling range are properly selected.

Owing to the fact that according to the process of the invention optimum temperatures can be adjusted in all parts of the reaction space, the utilization of the reaction space is substantially improved, and better conversions of the reacting substances and substantially higher yields of reaction products are obtained.

Substances of the most different kinds can be used as heat exchange medium. This variety of selection offers the advantage that the properties of the heat exchange medium can always be best adapted to give working conditions.

For instance, aliphatic or aromatic saturated or unsaturated hydrocarbons of whatever constitution or origin, such as paraffinic or aromatic hydrocarbons derived from natural or synthetic products, may be chosen as heat exchange mediums. These substances may be mixed in any desired way. They may also be substituted in any way, so that in the constitution formula one or more hydrogen atoms of whatever position may be replaced for instance by the hydroxyl- or the carboxyl-group, either as such or in the form of e. g. esters, amides, salts or the like, or also by halogens, especially fluorine and/or chlorine or groups similar to halogens, such as e. g. thiocyanogen, as well as the nitro- or amino-groups or other organic radicals, e. g. that of the amino alcohols. Moreover, substances of an entirely different nature or origin, such as metals, salts and compounds of other kind are suited as components of the cooling mixtures. Also mixtures of oxygen-containing organic compounds may be used, particularly mixtures of monovalent, bivalent or multivalent alcohols or other compounds, such as dioxane, diphenyloxide or the like, or substances obtained by the reaction of ethylene oxide with alcohol- or amino-groups. Likewise, other oxygen-containing substances, such as phenols, cresols and their homologues, naphthols and similar aromatic compounds may be applied, as well as mixtures of organic acids, such as e. g. acetic acid and the homologuous fatty acids or mixtures of same with other substances. Thus, also mixtures of acids may be applied, such as are obtained as low forerun fatty acids from paraffin oxidation. Should the liquids used contain iron-corroding components, corrosion-resistant materials are suitable for the construction of the apparatus.

The heat exchange liquids to be used in accordance with this invention should, with regard to their components and quantitative compostition, preferably be selected according to the temperatures required for the reactions to be carried out. In this connection, it sometimes may be appropriate in case of higher temperatures to use liquids boiling under pressure, partly to raise the boiling point, partly to prevent thermal decomposition of the applied substances.

The above mentioned oxygen-containing organic compounds prove to be particularly advantageous for the purpose of the invention when mixed with water if necessary in the presence of dissolving intermediaries. Thus, when carrying out reactions at low temperatures, e. g. at about 50–280° C., the heat exchange medium may consist of mixtures of methyl alcohol, or ethyl alcohol, or both, with water boiling under adequate pressure or vacuum. For temperatures above 150° C., mixtures of liquids boiling at a higher temperature may also serve as heat exchange medium, for instance glycol or glycerine and their homologues, and substituted products or even higher monovalent alcohols, such as the alcohols containing about 3–14 carbon atoms per molecule, may be considered as components for the mixtures, furthermore dioxane or similar compounds. According to the desired temperature, pressure may or may not be applied. The mixtures with water offer the advantage of cheapness and non-inflammability.

Among the halogenized hydrocarbons or hydrocarbon compounds, e. g. such substances prove to be advantageous which contain halogens, especially fluorine and/or chlorine in varying proportions, such as e. g. n-heptane, which is partly substituted by chlorine or by chlorine and fluorine respectively, such as $C_7H_4Cl_{12}$, $C_7H_4F_6Cl_6$, $C_7H_4F_{10}Cl_2$. Moreover, the following compounds or their mixtures with each other respectively may be taken into consideration: perfluoro-n-butane, perfluoro-n-pentane, perfluorocyclo pentane, perfluorodimethylcyclopentane, perfluoroethylcyclopentane, perfluoromethylcyclohexane, o-, m-, and p-perfluorodimethylcyclohexane, perfluorotrimethylcyclohexane, perfluoro - n - heptane, perfluorohexadecene or the like. Furthermore, there may be used e. g. a perfluoro hydrocarbon oil, produced from a paraffinic crude oil fraction (boiling-point at 250–300° C.), and a fluorinated lubricating oil (B. P. at 10 mm. Hg 147–208° C.) with a chain length of about 20 carbon atoms. Halogenated hydrocarbon compounds or sufficiently high halogen content will offer the advantage of being non-inflammable. Moreover, the cooling medium may be a mixture of melted metals, such as potassium, sodium, mercury or the like, or a mixture of other elements or organic chemical compounds provided that at least one of their components will evaporate at reaction temperatures. Appropriate organic chemical compounds are, for instance, sulphur monochloride, silicones or the like, or halogenides such as aluminum chloride and aluminum bromide, bismuth chloride, antimony fluoride and antimony chloride, arsenic fluoride and arsenic chloride, stannic fluoride or stannic chloride, titanium fluoride or titanium chloride.

If the reaction temperature is to increase first slightly and then more heavily, this, too, can be accomplished e. g. by an appropriate composition of the heat exchange medium; it can also be achieved in such a way that gases leaving the reaction space, if necessary after cooling down, are re-introduced to those parts of the reaction space, where lower temperatures are desired. These gases may be admixed to fresh feed gas newly entering the reaction space.

The boiling limits of the mixtures applied as heat exchange media may be chosen according to the reaction to be carried out and the design of the reaction space and the heat exchange space. They may further be selected according to the degree of rectification being effected through the partial evaporation of the heat exchange medium. In the case of slight rectification or the like in the heat exchange medium space the boiling ranges of the heat exchange medium should be within a wider range than in the case of stronger rectification. In this way the heat exchange becomes, to a certain extent, independent of the intensity of the rectification. So for instance boiling ranges of between 100–400° C. or of 150–350° C. in the case of a more intense rectification in the heat exchange medium space, will be appropriate for reaction temperatures of about 250° C.; they will be higher or lower respectively as when the reaction temperatures are higher or lower.

The same effects as with rectifying evaporation of heat exchange medium can be obtained in such a way that a boiling liquid medium is run along the walls of the reaction space, and that flow retarders are arranged along the way of the medium. These devices will cause a stage-wise drop of the pressure of the liquid medium along the walls of the reaction space. With the pressure dropping, also the temperature drops, at which the liquid medium boils. Thus it can be achieved by an adequate reduction of pressure on the way of the heat exchange medium along the walls of the reaction space that the liquid medium will boil at the temperature which is required at the respective spot of the reaction space.

Conventional contrivances, such as baffle plates, filling materials, jacketing tubes, or other throttling devices may be used as flow retarders, properly distributed in the space which is passed by the liquid medium and exchanges heat with the reaction space. The mixtures as described above, as well as liquids of uniform boiling point, such as e. g. water boiling under pressure, may serve as liquid heat exchange media.

This embodiment of the invention offers the further advantage that the heat exchange medium can be passed along the walls of the reaction space either concurrently with or countercurrently to the direction of the reacting substances inside the reaction space. Such method thus is applicable also when the reaction temperature is to drop along the course of the reacting substances through the reaction space irrespective of whether the substances are passed through the reaction space from top to bottom or vice versa.

The version of heat exchange by means of a rectifying partial evaporation of a mixture of liquids with different boiling points is also applicable to chemical reactions which are to take place continuously with the temperature dropping along the course of the reaction partners through the reaction space if the reaction partners are passed from bottom to top of the reaction space.

If the reaction space or the quantities of reacting substances fed thereto are but small and consequently the heat losses become greater than the heat set free by the reaction, or if the invention shall be applied to heat consuming or slightly exothermal reactions, the space for the heat exchange medium may be heated up. This may be done according to the invention by transferring the heat necessary for carrying out the process for instance by means of an appropriate source of heat to the medium in heat interchange with the reaction space. Electric radiators, if necessary of different heating power may then be arranged around the space containing the heat exchange medium or at suitable points of this space, for instance in the lower part of the apparatus, or the heat can be supplied to this container by producer-gas, illuminating gas, waste gas, steam ect. or in any other conventional manner. In this way, numerous endothermal reactions, which otherwise would remain incomplete, can be carried out continuously yielding a practically complete conversion, for instance thermal or catalytic cracking reactions, such as the cracking of higher boiling hydrocarbons into lower boiling ones, dehydrations, such as the splitting-off of water from alcohols, e. g. the production of butadiene from 1,3 butanediol, according to the equation CH₃CHOHCH₂CH₂OH— 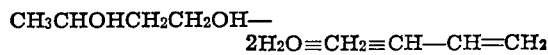
$$2H_2O \equiv CH_2 \equiv CH-CH = CH_2$$

or the saponification of esters, or esterifications, the water formed by the reaction being removed by distillation. The process as described is also applicable to such dehydrogenations as for instance that of cyclohexane into benzol or that of cyclization, e. g. of n-hexane into cyclohexane etc.

Exothermal chemical reactions, in particular, represent a large application field for this invention. The latter offers great advantages for the production of methane or higher hydrocarbons or higher hydrocarbons and oxygen-containing hydrocarbon compounds, such as alcohols, fatty acids and the like, for instance by catalytic hydrogenation of carbon monoxide. The invention can also be successfully applied to such exothermal gas reactions, for which a boiling cooling medium had hitherto not been used, so e. g., for the so-called "Isobutyl Oil" and "Synol-Synthesis."

Such reactions, in which lower reaction temperatures means a higher concentration of end products, i. e. in which decreasing temperatures tend to shift the chemical equilibrium in favor of the desired reaction-products, e. g. with the synthesis of ammonia, the catalytic oxidation of sulphur dioxide to sulphur trioxide, the production of methanol by means of catalytic hydrogenation of carbon monoxide or the like, will appropriately be carried out in such a way that the reaction temperature decreases along the way of the gas from the gas entrance to the gas exit of the reaction space. These reactions e. g. the synthesis of methanol may be carried out in conventional methanol synthesis reactors which have been provided, according to the invention with an annular space around their high-pressure jackets. This annular space serves to take up a mixture of boiling liquids according to this invention used as heat exchange medium.

It is known that alcohols of higher molecular weight can be produced in the methanol synthesis reactors from the same gas also used for methanol synthesis (the ratio of carbon monoxide to hydrogen being about 1:1), or by introducing methanol into this gas and at the same pressures, provided that the catalysts of methanol synthesis are applied in an alkalized form. So-called isobutyl oils will then be obtained which can be separated by distillation and will yield mainly alcohols from propyl- to hexyl-alcohol with only a small amount of higher boiling components. Also with this synthesis the temperatures of reaction can most profitably be controlled according to the features of this invention.

The new process may furthermore serve for improving the conditions of the introduction of hydrogen into organic compounds, i. e. of hydrogenation reactions, such as e. g. the hydrogenation of iso-octylene to iso-octane or for polymerization processes, such as the thermal catalytic polymerization of $C_3$-, $C_4$-, $C_5$- or the like hydrocarbons to motor fuel of good antiknock properties, particularly aviation gasoline, which polymerization is carried out at temperatures of about 120–180° C. to about 200–300° C. Moreover, the isomerization of butane or pentane or the like, substituting reactions such as chlorinations, brominations etc. as well as substitution of inorganic or organic groups in organic compounds, or reactions of liquid or melted substances with each other or with gases or solids, may be performed according to the process of the invention, whereby the reacting substances or a portion of the same are passed through the reaction space either concurrently or countercurrently.

Temperature control in reaction spaces, according to this invention, may particularly be applied also to non-catalyzed gas reactions.

When performing liquid phase syntheses by the new process, for instance the catalytic hydrogenation of carbon monoxide to higher hydrocarbons or mixtures of higher hydrocarbons and organic oxygen-containing compounds, especially higher alcohols, fatty acids or the like, by means of known catalysts, the gases and liquids may be recycled or passed straight through the reaction space. Furthermore, the invention may be applied to the well-known oxo-synthesis as well as to the liquid phase hydrogenation of the aldehydes being obtained by e. g. the oxo-synthesis to alcohols. Ethers may also be produced in this way, for instance ethyl ether from ethyl alcohol by means of sulphuric acid or benzenesulphonic acid, at temperatures of 135–140° C., by the continuous process. Moreover, the process of this invention may be applied to substituting reactions of any possible kind, e. g. halogenations such as fluorinations, chlorinations, brominations and iodinations, or alkylizing and arylizing reactions such as methylations etc., the substitution or inorganic and organic groups in organic compounds, the conversion of cyclic sulphonic acids with fused alkalies into phenols and many other reactions.

A further possibility of applying the invention is e. g. offered by the synthesis of acrolein, which is carried out in special reactors at about 515° C., without using a catalyst. By this synthesis acrolein is formed, besides propylene, from diallyl ether according to the equation:

$$CH_2=CH-CH_2-O-CH_2-CH=CH_2-CH_2=CH-CHO+CH_2=CH-CH_3$$

This reaction is particularly sensitive to the influence of temperature; slight fluctuations effect a heavy decrease in the yield of acrolein, and substantial amounts of carbon may be formed due to some side-reaction. This process will yield profitable results when carried out in accordance with this invention.

Further examples of reactions to which the process according to this invention may be applied, are autocatalytic reactions such as the conversion of oxy-acids into lactones, which is catalized by the hydrogen ions, split off from the oxy-acids, or oxidation reactions, as for instance the oxidation of higher paraffins to fatty acids and the like.

The process according to this invention offers the further advantage that it can be operated using conventional reaction equipment, which need not or only slightly be modified or supplemented.

With the known lamellar reactors in which higher hydrocarbons and the like are produced by catalytic hydrogenation of carbon monoxide, the cooling pipes end outside the reactor in headers which latter end on both sides in vertical rising pipes. The four rising pipes are connected with a steam collector in such a way that the water circulates continuously through the pipes.

According to the invention the connection between the steam collector and the two rising pipes is interrupted on the one side of the reactor, moreover these rising pipes are partitioned by plates so as to provide for each collecting pipe one section of the rising pipes. A suitable number of perforated plates, filling bodies or the like are appropriately installed in the rising pipes on the other side of the reactor, and a connecting pipe leading to the respective rising pipe on the opposite reactor side is provided appropriately outside the reactor for each section of the rising pipes on the other reactor side. This connection pipe can be arranged horizontally or in a slightly rising position.

The process is now operated in such a way that part of the liquid mixture is evaporated in the cooling pipes and that the vapor streams into the rising pipes which are connected with the steam collector. In these rising pipes, the vapor will stream upward. The insertions or such like devices arranged in these rising pipes will prevent that the vapor entrains liquid and that a temperature balance is reached between the liquid in the upper part and the liquid in the lower part of these rising pipes. The liquid may continuously flow back through the connecting pipes to the two other, partitioned, rising pipes, so that these rising pipes are continuously filled with liquid.

Figure 5:
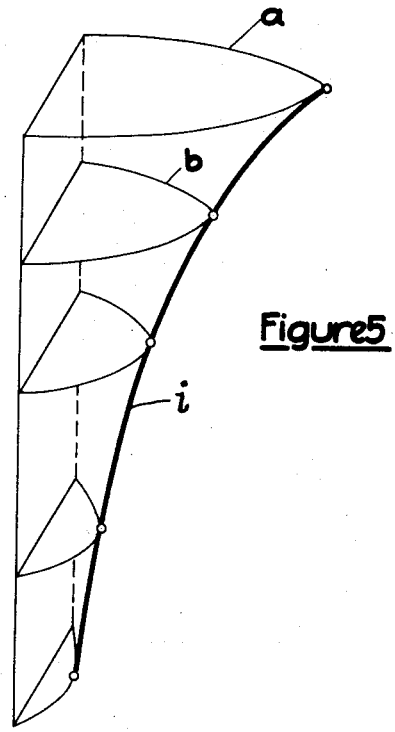
Figure 6:
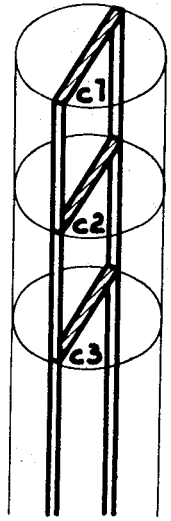
Figure 7:
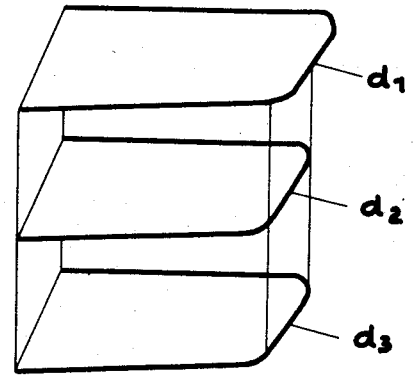
Figure 8:
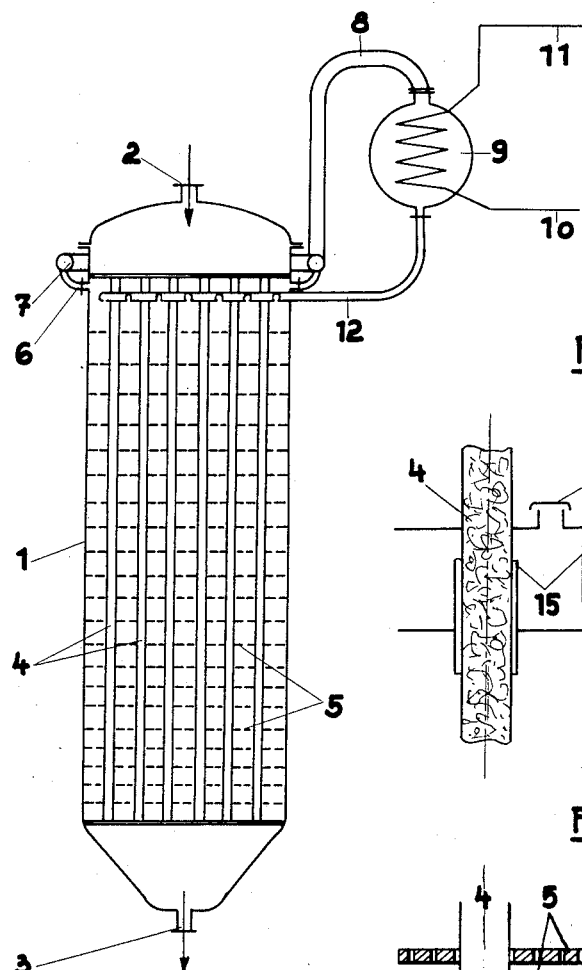
Figure 9:
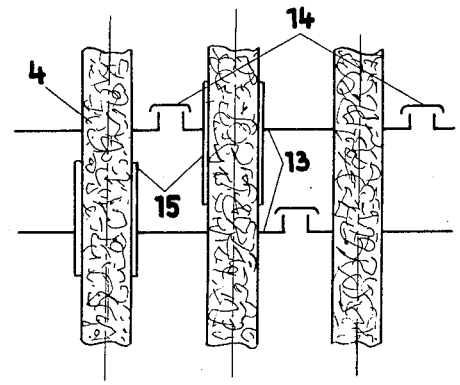
Figure 10:
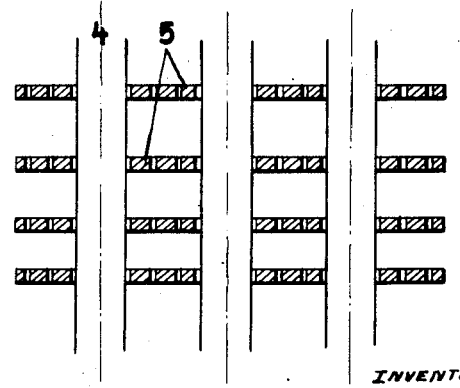
Figure 11:
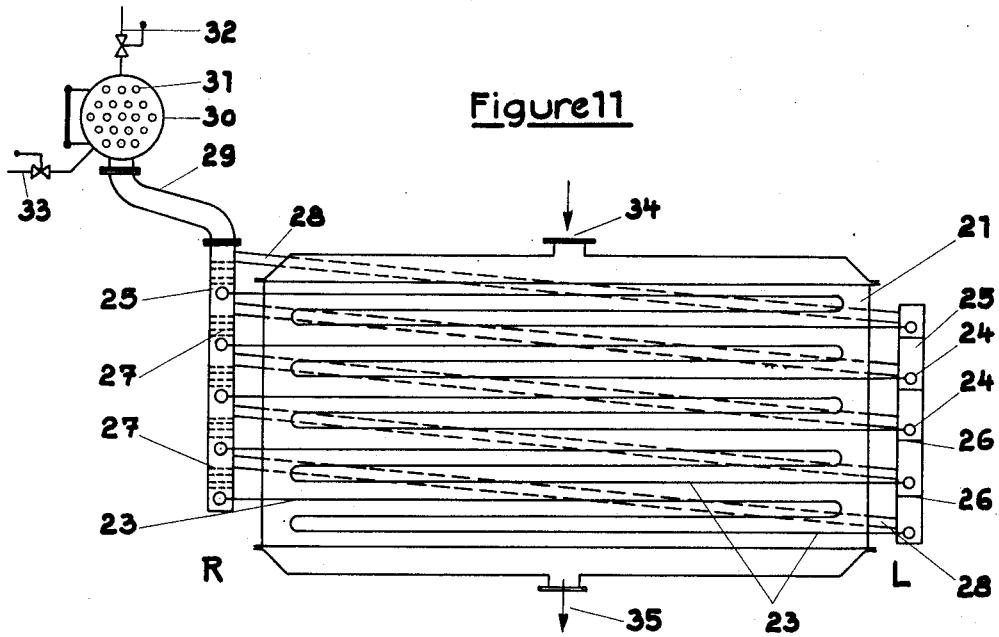
Figure 18:
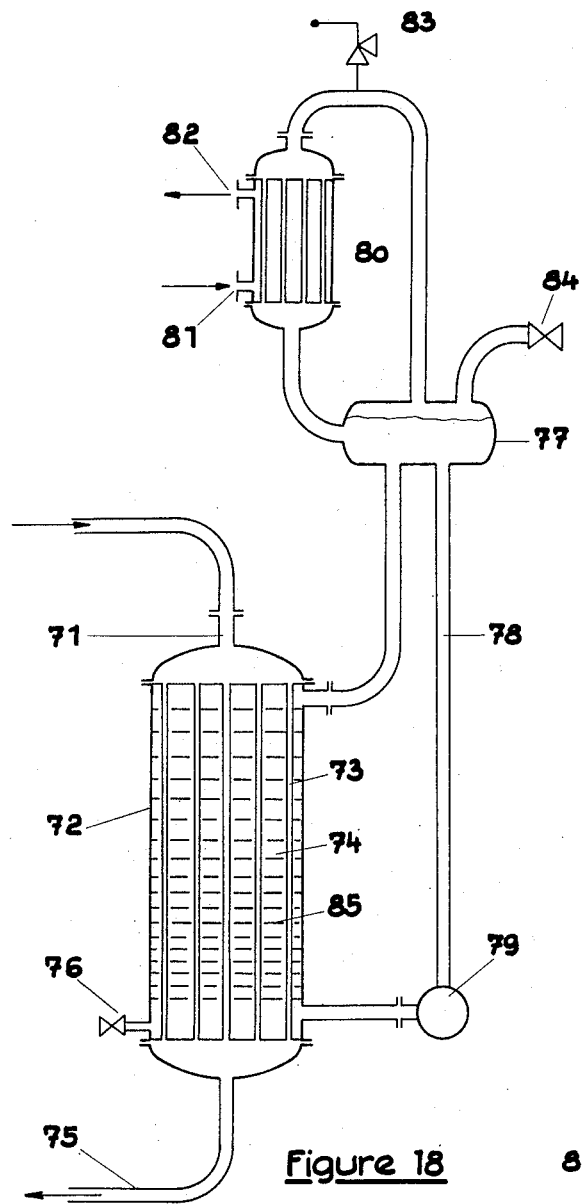
Figure 19:
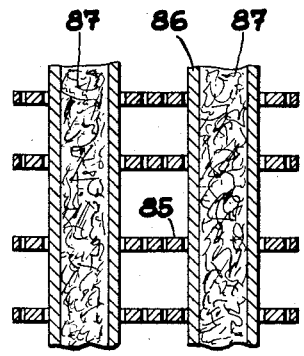
Figure 20:
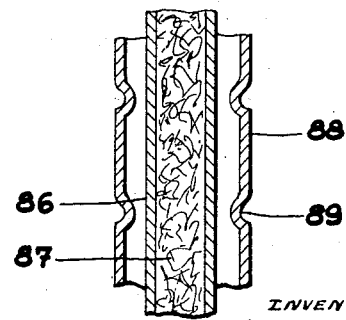

While our invention can be embodied in different forms and may be carried out in different kinds of apparatus, the invention itself, as to its objects and advantages, and the manner in which it may be performed, may be better understood by referring to the following description taken in connection with the accompanying drawings forming a part of the invention in which:

Fig. 1 is a chart of the relative conversion conditions of both the known and the new process, as applied to catalytic gas reactions. Fig. 2 is a temperature curve of the process known, Fig. 3 shows the course of temperature in the catalyst and in the cooling medium which can be reached by the invention, Fig. 4 shows several cross sections through the catalyst, taken rectangularly to the flow of gas through the catalyst layer. Fig. 5 shows the course of temperature of the known process within the cross sections plotted in Fig. 4. Fig. 6 shows the same cross sections as Fig. 4, and Fig. 7 the corresponding temperatures within the cross sections of the catalyst in the process according to the invention. Fig. 8 is an exemplifying scheme of a tube reactor shown in sectional elevation and operable according to the invention. Figs. 9 and 10 illustrate two different designs of the cooling space of said reactor. Fig. 11 is a sectional elevation, and Fig. 12 a horizontal section of a lamellar reactor, designed according to the invention and suitable for use of a cooling-medium mixture of components of different boiling points. Fig. 13 is a sectional elevation of a modification of the reactor shown in Figs. 8–10, fitted with special installations which allow for increased gas speeds. Figs. 14–17 show some further types of those special installations in a fragmentary sectional elevation. Fig. 18 is a sectional elevation of another modification of a tube reactor; with this reactor, the cooling medium will be circulated through the cooling space by means of a circulating device. Figs. 19–20 show details of this reactor.

Figs. 1–7 illustrate graphically the advantages obtainable through the invention with respect to improving the conversion and distributing the temperatures in the reaction space in case of catalytic reactions of gases. The example chosen is that of Fischer-Tropsch synthesis carried out in known tube reactors on one side, and in tube reactors according to the invention on the other side.

If with exothermic catalytic gas reactions taking a continuous course the temperature of the cooling medium and therewith the reaction temperature will be increased according to the invention, starting from the entrance of the reacting gases to the catalyst and ending with their exit from the latter, in such a way that the reaction velocity remains constant all along the passage of the gases through the catalyst, then also the rate of conversion will remain constant in all parts of the reaction space, and there will result a uniform heat evolution all along the gas passage. Accordingly, the curve demonstrating the conversion will have a horizontal course when the process is operated according to the invention. Equal total conversion assumed two conversion curves are plotted in Fig. 1, curve $a$ illustrating the typical conversion observed with known processes, and the dotted curve $g$ taking the horizontal course typical of processes according to this invention. The latter straight curve may slightly rise or drop when the reaction temperature towards the end of the reaction is so adjusted that the reaction velocity will increase or, respectively, decrease along the gas passage. A rate of conversion as expressed by the maximum of curve $a$ of Fig. 1 will be encountered in only a very small part of the reaction space with known processes. Operating the process according to the invention, i. e. maintaining the reaction velocity at a constant level all along the passage of the gases through the catalyst, makes it possible to obtain the same rate of conversion which corresponds to the maximum of curve $a$ all along the gas passage.

Hence the dash-and-dotted straight curve $h$ in Fig. 1 represents the conversion rate which can be reached by the invention.

Graph I in Fig. 3 represents the temperature of the cooling medium for a uniform conversion, which the dotted straight curve $g$ of Fig. 1 corresponds to and which would be of the order common for known processes.

Graph II shows the corresponding catalyst temperature.

According to the invention, the conversion can easily be increased to such an extent that the rate of conversion reaches a height which corresponds to the maximum of curve $a$, Fig. 1, and which is now the same all over the catalyst. With equal cooling medium temperature the graph showing the catalyst temperature will shift to the maximum of the curve $b$ of Fig. 2, and curve III of Fig. 3 results as temperature curve of the catalyst at this increased conversion.

As may be deduced from Figs. 1 and 3, the increase of the conversion obtainable by the invention is considerable. The invention yet offers the possibility to increase the conversion still further.

With the conventional reactors for the Fischer-Tropsch process with the catalyst contained in cooled tubes the catalyst mass has the temperature differences, shown in Fig. 5 in the cross-sections, Fig. 4, laid square to the axis of the tubes. The catalyst granules or particles lying close to the cooled surface have a temperature only a little, i. e. 3 to 4° C., above the temperature of the cooling medium, the temperature of which is about equal the same along the whole length of the tube.

With increasing distance from the cooling surfaces, i. e. towards the center of the catalyst layer cross-section, the temperature rises very steeply in that part of the reaction tube where the main conversion takes place, as shown by cross-sections $a$ and $b$ of Figs. 4 and 5. With decreasing conversion the temperature peak observed in the center of the catalyst layer cross-section gradually diminishes. Accordingly, the temperature curve of the radial intersection lines of the catalyst layer cross-section is flatter near the gas exit end of the reactor tubes due to the lower conversion taking place here.

With the known process, the temperatures of the single catalyst grains are not uniform throughout the same cross-section of the catalyst layer. Since the heat transfer from a catalyst grain in the center to the cooling surface has to overcome a greater heat transfer resistance than that from a catalyst grain lying near the cooling surface, the conversion graph I showing the conversion rates within the cross section of the catalyst layer takes about the same course as curve $a$ of Fig. 1, which depicts the conversion rates over the length of the catalyst layer. Here again the result is a limitation of the temperature gradient between catalyst and cooling medium, and it applies also to the uniform distribution of the conversion over the entire gas passage obtained according to the invention. Now, the temperature differences between the catalyst grains decrease when the gas velocities within the catalyst increase. The turbulent gas movements, growing with increasing gas velocities cause the heat transfer from a central catalyst grain to the cooling surface to become about as good as that from the catalyst grains or particles located nearer to the cooling surfaces.

The gas load of the catalyst at which this will realize is about 3–5 times that of the hitherto used gas load of the catalyst or higher, depending on the nature of the catalyst.

While with the known process it was not possible at all even at high gas velocity to increase the gas load of the catalyst, i. e. the gas volume charged to the unit of catalyst volume per unit of time, because then the temperatures of the catalyst would rise far too high where the synthesis gas first reacts on the catalyst thus spoiling the latter immediately, entirely different conditions have been created by the invention. For, if according to the invention, the reaction velocitity is kept constant along the entire length of the gas passage through the catalyst, and if by high gas velocities also the temperature peaks in the center of the catalyst layers are removed, any endangering of the catalyst, even at very high gas load, can be removed by maintaining a sufficient span of temperature between reaction space and cooling medium. That is, the cooling is applied to such a degree that the gases and catalyst grains, nearest to the wall of the reaction space, have the optimum reaction temperatures. According to this invention, the same temperature conditions are also secured within the catalyst layer by combining the high gas velocities of the substances reacting with one another in the reaction space with the maintenance of uniform reaction velocities. This is valid, too, for a very great difference between the reaction temperature and the temperature of the cooling medium. The greater this difference, the better will be the heat transfer to the cooling medium and the cooling and the higher can be the gas load and the conversion. At high gas velocities in the catalyst the individual catalyst grains or particles lying near the cooling surfaces in the radial cross sections laid across the tube, show already a considerably higher temperature than the cooling medium.

The temperature difference between these catalyst grains or particles and the cooling medium conforms to the rate of conversion. It may amount to e. g. 40 to 50° C. and higher. The turbulent gas flow in the catalyst, caused by the high conversion and effecting a uniform temperature distribution, effects the temperature curve in such manner, that in all cross-sections, e. g. $c1$, $c2$, and $c3$ of Fig. 6, the temperature curves e. g. $d1$, $d2$, and $d3$ of Fig. 7 are all equal or nearly equal, owing to the constant or nearly constant conversion in all parts of the catalyst, which results from the invention.

Furthermore, it becomes possible by the invention to increase the conversion at random within reasonable limits by rating the temperature difference sufficiently high, while maintaining about uniform conversion and high gas velocities and equal temperature difference between cooling medium and catalyst throughout the entire catalyst charge. The process may be operated e. g. so that there will result graph IV, Fig. 3, for the temperature of the cooling medium and graph V, Fig. 3, for the temperature of the catalyst. In order to prevent too strong reactions near the gas inlet it may be useful to alter somewhat the ascent of the temperature curve, as is indicated in Fig. 3.

This can be done, for example, by keeping the temperature of the cooling medium somewhat lower at the gas entrance side of the reactor while making the temperature curve of the cooling medium rise somewhat steeper.

The same effect can be obtained by following the above-described measures or even without following them by recycling a portion of the gas mixture leaving the reactor with fresh feed gas to the reactor. Or, in lieu of these measures or in combination with them, it is possible to maintain higher gas velocities in those catalyst zones, that lie near the gas inlet and in which the reaction velocity might become too high, due to the high concentration of the reacting gases, than in the adjoining catalyst zones.

In the case of catalysts being arranged in tubes, the increase in gas velocity can be accomplished for example, by installing in the tubes displacement bodies, guidesheets, by-passing plates, turns, diverters or the like, which will cause an interruption of the straight gas flow and force the gases to take a considerably longer course through the catalyst. The same arrangement can be employed too, when the catalysts are not arranged in or between tubes or double tubes respectively, but e. g. between heat interchanging plates or in other known fixed bed arrangements. Installations which make the cross-section alternately narrow and widen and effect a rapid change of velocity, which may even be intensified up to a pulsating streaming, and which cause an improved heat transfer by destroying the laminar boundary layers on the heat exchange surfaces will make possible a considerable increase in reactor efficiency also.

The effect that at high gas velocities the heat of reaction is removed rapidly and uniformly from any point of the catalyst cross-section can be utilized within the frame of the invention in such manner that catalyst layers of widths of more than 15 mm., advantageously e. g. 20–50 mm. and more be applied. The high gas velocities provide for a good heat interchange within the catalyst even with larger catalyst layer diameters and prevent accumulations of heat and local overheatings, which would lead to the damage of the catalyst and to increased formation of undesired products, e. g. an excessive formation of methane on production of higher hydrocarbons by hydrogenation of carbon monoxide.

Furthermore, the application of higher gas velocities, according to the invention, makes it possible to work with high catalyst layers. The simultaneous application of larger layer diameters facilitates the removal of spent catalysts from the catalyst space and thus renders possible the construction of considerably larger reactor units. With equal gas throughout per unit of catalyst an increase of the height of the catalyst layer to for example 20 meters length results in eight times the gas velocity of that of the known processes.

The devices used for increasing the gas velocities in the catalyst zones lying near the entrance side of the reactor can be applied also to the other catalyst zones. In these zones an increase of gas velocities is then also reached, which has the advantage of a considerably better heat transfer from gas to cooling surface, which increases by about the 0.8th power of the velocity. The installations in the adjoining zones of the catalyst can, if necessary, be graduated so that the gas velocity gradually decreases from the gas inlet side of the reactor to the gas outlet side.

The substantial increase in gas conversion all along the way of the gas passage through the catalyst obtained according to the invention yields the astonishing result, that the heat removal no longer places an upper limit on the height of conversion.

The limits are set rather by the reactivity of the catalyst. Moreover, as mentioned before, the invention gives on hand the possibility to use the catalyst in wider and longer layers.

The installations used for increasing the gas velocity shall preferably be constructed as heat exchange surfaces according to the invention. This can be done, for example, by using spirally wound fins on the tubes through or around which the cooling medium circulates or by connecting by welding the baffle- and by-pass plates or the displacement bodies to the heat exchange surfaces.

The known reactors may be used for the process according to the invention; they require relatively simple modifications only as shown by example in Figs. 8–20.

Fig. 8 shows the jacket 1 of the reactor, the inlet 2 and the outlet for the gases 3, which pass through tubes 4 filled with catalyst. These tubes are surrounded by a cooling medium filling the space of the reactor not occupied by the tubes. In this cooling space perforated plates 5 are arranged. The vapors of the cooling medium leave the reactor through the fittings 6 leading to the ring main 7. From the ring main the vapors flow through the duct 8 into a heat exchanger 9. Here they condense and lose their heat of condensation to water, which enters the heat exchanger through duct 10 and leaves it as steam through duct 11. The condensed cooling medium from the heat exchanger 9 is recycled to the reactor 1 through duct 12.

If a sharper rectification is required, the cooling space may be constructed after the principle of Fig. 9, in which there are arranged around the catalyst-filled tubes 4, capped plates 13, with caps 14. 15 are the overflows, which should preferably be arranged high enough, so that the catalyst-filled tubes will be covered by the cooling medium as uniformly as possible.

The invention can be applied also to the so-called lamellar reactors, which are used for the catalytic hydrogenation of carbon monoxide to produce hydrocarbons and, if desired, hydrocarbon compounds.

As it is known, the lamellar reactor consists of a rectangular vessel with numerous sheets being inserted vertically in it. Through these sheets (laminae), which are spaced at 9 mm. intervals, numerous tubes are led, through which the cooling water flows. The two ends of each tube empty into horizontal collecting tubes, outside the reactor. These collecting tubes again, enter into vertical, rising pipes at both ends. The 4 rising pipes are connected with a vapor collector in such a way that a continuous circulation of water through the tubes takes place.

According to the invention, the connection of the two rising pipes with the vapor collector is interrupted at one side of the reactor and, moreover, these rising pipes are subdivided by plates in such manner that one segment of the rising pipe is provided for each collecting tube. Sieve plates, fillers or similar installations can be inserted in the rising pipes on the other side of the reactor. For each segment of the two rising pipes, which are subdivided by plates, a connecting tube to the rising tubes on the opposite side of the reactor is provided. These connecting pipes may preferably be installed outside of the reactor and are arranged horizontally or slightly rising.

During operation some portion of the liquid mixture evaporates within the cooling pipes and the vapor flows off to the rising pipes connected with the vapor collector. In these rising pipes the vapor streams upward.

The installations or insertions prevent the vapor from entraining liquid and prevent further a balance of temperature between the liquid in the upper part and that in the lower part of the rising pipes. Through the connecting pipes, liquid may continuously flow back to the other two subdivided rising pipes, so that these rising pipes are always filled with liquid.

Figure 12:
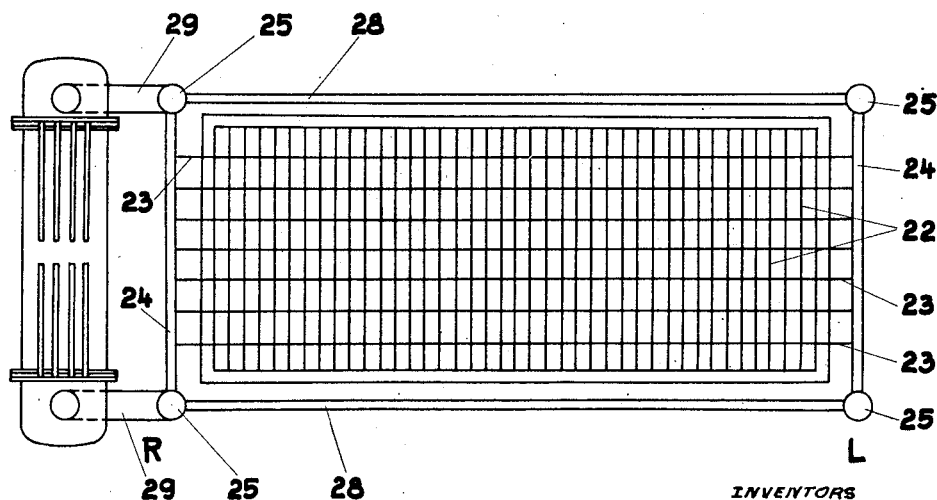

In Figs. 11 and 12, 21 is the jacket of such reactor, 22 are the lamellar sheets, and 23 the cooling tubes, which are coiled and end in the collecting tubes 24. The collecting tubes 24 open with both their ends into the rising pipes 25. The rising pipes at the side L of the reactor are subdivided into segments by means of plates 26; and in the rising pipes at the side R of the reactor, sieve plates 27 are installed. 28 are the connecting pipes, which lead from the rising pipes on one side of the reactor to those on its opposite side. The rising pipes of the one side of the reactor are connected with the vapor collector 30, by pipes 29. The vapor collector 30 is provided with heat exchange tubes 31. The latter are connected with pipes 29, so that the vapors delivered by tubes 29 will condense in the pipes 31. The heat of condensation is transferred to water contained in the vapor collector 30. It evaporates and the steam discharges through the duct 32. 33 is the water supply pipe to the vapor collector. 34 is the inlet for the feed gases to the reactor, and 35 the outlet for the gases containing the products of reaction.

By the segments of the rising pipes on one side of the reactor, the connecting pipes 28 and, if need should be, the insertions or the like installations in the rising pipes on the other side of the reactor as well as by the cooling pipes there are created different compartments lying one above the other. In each of these compartments the cooling meduim may circulate in an independent cycle, but no continuous rapid mixing of the cooling media circulating in the individual compartments will occur. Thereby and by the reflux of the cooling medium condensate from the vapor collector it is reached that sort of a rectification of the cooling medium occurs in the rising pipes, so that in the lower compartments there will be present more higher boiling components of the cooling medium than in the upper compartments. The reactor temperatures conform to the cooling medium temperatures, so that, accordingly, the lower catalyst zones in the reactor operate at higher temperatures than the upper zones. Therefore, the conversion of the reacting gases, e. g. CO and $H_2$, to hydrocarbons or the like will be the same throughout all catalyst zones, and the influence will be balanced which the decreasing concentration of reacting gases, effected by their passage through the catalyst, would exert upon the reaction velocity were the temperature equal all through the reactor.

According to Fig. 13, the reactor suitable for operation at higher gas speeds, comprises the jacket 41, the tubes 42 which are filled by the catalyst and fastened to, e. g. welded into, the tube bottoms 43 and 44, and the covers 45 and 46.

The feed gas enters the reactor at 47. It flows through the catalyst arranged in the tubes 42. In these tubes it follows the windings of the insertions 48, which have shapes resembling a screw so as to render the way of the gases through the catalyst as long as possible. In order to maintain the conversion rate about equally high all along the passage of the reacting gases through the catalyst, the leads of the screw-like shaped insertions 48 are higher in the lower than in the upper zones. The gas leaves the reactor through the fitting 49.

Perforated plates 50 are provided in the cooling medium space. These serve to increase the temperature difference which will occur between the highest and the lowest spot of the cooling space due to the preferential evaporation of the lower boiling components of the cooling medium, when liquid mixtures are used as cooling medium the components of which have different boiling points. The cooling medium vapors which form in the cooling system flow through duct 51 to the heat exchanger 52 and there condense. Through duct 53 the condensate returns to the upper part of the cooling medium space. In the heat exchanger 52 the vapors of the cooling medium give off their heat of condensation by indirect heat exchange e. g. to water entering the heat exchanger at 54 and leaving it as steam at 55. Instead of screw-like shaped insertions, other devices for increasing the velocity of the gases passed through the catalyst, may be used, for instance, baffle plates 56, Fig. 14, fixed to the cooling surfaces 42, forcing the gas to take a zig-zag course through the catalyst. According to Fig. 15 similar baffle plates 57 are arranged in pipes 59 and on pipes 60. This device differs from those according to Fig. 14 in that double tubes are used as catalyst space. Both with its upper and its lower end each inner tube 58 is connected with the cooling medium space, so that it is also filled with cooling medium. Fig. 16 shows an arrangement similar to that of Fig. 15. Here, too, double tubes are used to carry the catalyst. The diameter of the inner tube 60, however, decreases stepwise towards the lower end of the tube. Such design provides for larger cooling surfaces in the uppermost part of the catalyst tube on the one side, while it results, on the other side, in less wide catalyst layers than in the lower part of the tube. Accordingly, there is reached in the upper part of the tube not only a more intensive cooling but also a higher gas velocity than in the part below.

Fig. 17 shows still another embodiment of a double tube used as container for the catalyst. The outer tube 61 may have a smooth wall or may be provided with baffles. The inner tube 62 shows reductions 63 and extensions 64 of its diameter. This causes the gas velocity in the catalyst lying in the space between the two tubes repeatedly to increase and to decrease. Thus, there develops a pulsating flow destroying the boundary layers at the catalyst and at the heat exchanging surfaces and improving the heat transfer still further.

The catalyst tube reactor 72 shown in Figure 18, consists of a larger number of tubes 73 arranged in the space 74. The tubes are filled with catalyst, and the cooling medium is circulated through the space 74 by means of a conveying device. The mixture of substances to react enters the catalyst at 71, the reacted mixture leaving the reactor through duct 75. The cut-off device 76 serves as outlet for the cooling medium or any deposits possibly formed. A mixture of liquid and vapor rises to a vapor collector 77 where the vapor separates from the liquid. The latter flows through a down-pipe 78 to a pump 79 which circulates the cooling medium between reactor 72 and vapor collector 77. The cooling medium vapor streams to a heat exchanger 80, into which feed water enters through 81, leaving it as steam through 82. By indirect heat exchange with the water the cooling medium vapor condenses in the heat exchanger 80, the condensate being returned to the vapor collector 77. 83 is a safety valve. The cut-off device 84 may be used for filling the unit upon start of operation, as well as for connecting a vacuum pump to the reactor in case the properties of the cooling medium necessitate the adjustment of the required boiling temperatures an operating pressure lower than the atmospheric pressure, as is known, the dependence of the boiling temperatures from the pressure is particularly great below one atmosphere absolute. The flow resistances, required according to the invention to obtain a pressure gradient within the space 74, filled with the boiling cooling medium, are brought about e. g. by means of perforated plates 85, details of which are illustrated in Fig. 19.

The tubes 86, filled with catalyst 87 are shown in sectional elevation.

Instead of the plates according to Fig. 19, jacket pipes 88 according to Fig. 20, may yield the same effect, particularly when they are arranged at a proper distance from the catalyst tubes or, when they are provided with annular bulgings 89 directed towards the axis of the tube 86 or with similar additional devices narrowing the cross-sections. Furthermore, also filling bodies are applicable to create a resistance. Pump 79 will press the cooling medium through the interspaces between the catalyst tubes 86 and/or between the jacket tubes 88 and the catalyst 86. The proper distribution of the pressure gradient along the length of the tubes for a cooling medium of given boiling behaviour can, in order to reach a certain distribution of temperature, be achieved now, according to the invention, in a simple way by e. g. altering corresponding to the purpose the distances between the installations within the cooling space, for instance between the partition walls 85, according to Fig. 19, from the bottom to the top, or by increasing or diminishing the width of the openings in the partition walls, through which the cooling medium passes. Any other proper alteration of the flow resistances serving the above stated aim will be possible too.

As cooling media for catalytic reactors, for instance for hydrocarbon synthesis, preferably liquid synthesis product fractions of a certain boiling range are used. The purpose of such measure is explained as follows:

For a definite reaction, both a suitable temperature difference between the upper and lower zones, and a suitable temperature course must be maintained in the catalyst tubes or the cooling elements 73, in order to obtain the described uniform distribution of the conversion; the course of the temperature along the catalyst tube wall is to remain as equal as possible or at least similar at different reactor performances.

At invariable output of the pump 79 the portion of the cooling medium to be evaporated, must increase proportionally to the reactor performance so that the correspondingly increasing amounts of heat can be removed. Then the boiling temperature of the cooling medium increases accordingly in the upper part of the reactor, since the boiling temperature of a mixture of liquids of different boiling points increases with the portion evaporated therefrom. This effect would counteract the effect obtainable by the invention. By the proportionally increased evaporation, however, the pressure drop per unit of way of the cooling medium along the tube walls, increases, so that the total pressure gradient within the cooling space increases; this effect compensates the above explained increase in the boiling temperature. The choice of the course, the boiling of the cooling medium is to follow, together with the described distribution of the pressure gradient within the cooling space and the constant circulation of the cooling medium, according to the invention, offers the possibility that, independent from the gas load of the reactor, that distribution of temperature is maintained, which is required for the most exhaustive use of the catalyst space. This distribution of temperature, is controlling itself with changing gas loads of the reactor. In the lower part of the reactor, the increase in the boiling temperature is caused by pressure rise due to increased partial evaporation of the cooling medium. In the upper part, it is increased by the increase of evaporation of the cooling medium. The absolute height of the temperature level in the reactor may now be influenced in a simple manner by adjusting the temperature through pressure control in the cooling system to the height required for securing optimum reaction conditions. This can be accomplished by a pressure regulator which would be connected to the shut-off valve 84 in the example shown in Figure 18. The pressure to be maintained will be set higher or lower in accordance with the reactor performance by a temperature feeler in the cooling space which should preferably be installed in that part of the cooling space where the temperature will be highest. The pressure in the cooling space may, however, be controlled also in a different manner; e. g. a flow meter be employed measuring the load of synthesis gas in the catalyst and setting the characteristic temperature corresponding to this load.

In a reactor for e. g. hydrocarbon synthesis by carbon monoxide hydrogenation employing water as cooling liquid, at a conventional length of the catalyst tubes of 2.5 to 4.5 meters and a medium operating temperature in the range of 200 to 300° C., the difference of the hydrostatic pressure in the cooling space between top and bottom amounts at most 0.45 ata. (atmosphere absolute). This excludes noteworthy temperature differences in the cooling space. By the fact that the reaction is confined to the gas entrance side, the overtemperature at the individual catalyst grain is particularly high at this part of the tubes thus favoring the formation of undesired by-products which is a considerable disadvantage of the hitherto practiced operation of catalytic reactions. With hydrocarbon synthesis carried out in such manner, there is formed e. g. undesired methane in amounts of 10 to 20% and more.

Until now, this disadvantage has been considered as sort of a necessary evil and has been by-passed by keeping the hourly gas load around 1,000 cu. m. (0° C., 760 mm. Hg, dry) of fresh feed gas, related to a commercial catalytic reactor of a capacity of 10 cu. m. catalyst.

Another escape tried was to recycle the reaction participants to the reactor entrance, which resulted in a substantial reduction of the overtemperature at this part of the reactor, and in a more uniform distribution of the reaction over the entire reactor; but the improvements thus obtained did not suffice yet.

When carrying out hydrocarbon synthesis cited here as example according to the invention, the temperature increase in the cooling space along the cooling elements of a reactor used for the operation will result either in the formation of substantially less methane; or, when keeping to the formation of the same amount of methane as with former operation, in a considerable increase—up to five times—of the performance of such reactor. While hitherto 10 cu. m. of catalyst in a reactor of conventional design yielded about two tons of liquid synthesis products daily, it is now possible to obtain yields of 10 tons and more per day. If there were applied such loads to a reactor in which there would take place a conversion following the reaction equations $$CO + H_2 = CH_2 + H_2O$$

on use of conventional cobalt catalysts, or $$2CO + H_2 = CH_2 + CO_2$$

on use of conventional iron catalysts; and in which any of the cooling methods that became known hitherto were employed, the gas passage would be plugged within short, due to overheating of the catalyst at the gas entrance side and consequent carbon deposits resulting from CO-splitting following the equation $2CO = C + CO_2$.

The new process will give still higher reactor performances when it will be combined with hitherto known processes for effecting an increase in the reactor performance such as recycling of the reaction participants.

*Example 1*

When producing higher hydrocarbons by catalytic hydrogenation of carbon monoxide according to the process of the invention, a cooling medium, boiling between 120 and 350° C. and consisting of a mixture of saturated hydrocarbons of a major part of $C_{11}$, $C_{12}$, $C_{13}$, hydrocarbons and a minor part of $C_{14}$ and other hydrocarbons, is passed through the reactor that might be designed as illustrated in the drawing. A conventional cobalt-thorium-oxide catalyst was used, containing 100 parts (by weight) of cobalt, 5 parts of thorium oxide, 8 parts of magnesium oxide, and 200 parts of kieselguhr. The synthesis feed gas was a pressure gasification gas generated from lignite at a pressure of 20 atmospheres with steam and oxygen.

The feed gas contained:

| | Per cent |
|---|---|
| $CO_2$ | 1.2 |
| $C_nH_m$ | 0.1 |
| $CO$ | 23.3 |
| $H_2$ | 54.6 |
| $CH_4$ | 18.6 |
| $N_2$ | 2.3 |

The process was operated in one stage, with synthesis gas recycling. A twofold recycle was employed, viz. the total amount of gas fed to the reactor being composed of one volume of fresh feed gas and two volumes of recycle gas, i. e. synthesis end gas.

The synthesis end gas had a composition as follows:

| | Per cent |
|---|---|
| $CO_2$ | 7.2 |
| $C_nH_m$ | 0.5 |
| $CO$ | 1.0 |
| $H_2$ | 0.8 |
| $CH_4$ | 82.3 |
| $N_2$ | 8.2 |

The temperature in the upper part of the catalyst reactor amounted to 190° C., rising to 210° C. towards the lower part. The gas load of catalyst was 300 cu. m. per cubic meter of catalyst. The reactor was operated at a gas pressure of 20 atmospheres. It yielded 60% gasoline, 25% diesel oil, 12% paraffin gatsch, and 3% hard wax. The gasol ($C_3$ and $C_4$ hydrocarbons) remained in the end gas, which may be used with advantage as pipe line gas for long distance transmission or for the chemical industry, as its heating value amounts to about 8,000 kilogram calories and as it contains more than 80% methane.

From the results cited it appears that with the process according to the invention the catalyst has worked up 99.5% of the gas in a one-stage operation at a gas load which is three times higher than the usual load of the conventional Fischer-Tropsch synthesis.

*Example 2*

The Oxo synthesis, in which carbon monoxide and hydrogen are reacted with unsaturated hydrocarbons to form aldehydes was performed in a vertical high pressure vessel of 8.5 m. length and 200 mm. inner diameter. This tube is surrounded by a cooling jacket which is filled with a mixture of hydrocarbons of different high boiling points. The interior of the reactor carries a cooling system consisting of tubes arranged like a grate and filled with the same liquid as the cooling jacket. The boiling points of the hydrocarbons used as cooling medium ranged between 120 and 220° C., 220 kg. of a suspension of 4.5 parts of a cobalt catalyst, consisting of 30% cobalt, 3.5% magnesium oxide, the balance being kieselguhr, and of 95.5 parts of an olefinic medium oil are passed through the tube from top to bottom. This olefinic oil has a boiling range of between 265–292° C. and an iodine number of 48. The liquid is heated to 160° C. before being fed to the high pressure tube, and the temperature in the lower part of the high pressure tube is kept at 180° C. At the lower end of the tube intensively purified water gas of conventional composition is introduced at a pressure of 200 atmospheres. The gas is kept in vivid circulation. The gas recycling effects thorough stirring and whirling of the catalyst suspension. The throughput of the high pressure tube can be increased up to 280 liters/hour and a more than 95 per cent conversion of the olefines, which react to aldehydes, is obtained. If, however, a reactor is employed which operates after the conventional process with equal temperature distribution, a throughput of 220 liters per hour cannot be exceeded without that the conversion declines considerably.

*Example 3*

The mixture reacted with water gas to aldehyde by the process described in the second example was subjected to hydrogenation with hydrogen at 200 atmospheres pressure in a reactor of the same construction as in Example 2. The temperature was at the top of the furnace 170° C. and at the foot 210° C. With this temperature gradient, reached e. g. by a boiling hydrocarbon mixture in the reactor jacket boiling between 120 to 300° C. and by refluxing the condensate of the hydrocarbon vapors to the top of the jacket, a total hydrogenation of the aldehyde solution, as produced according to Example 2, to alcohols can be reached at a rate of 280 l./hr. Without the rising temperature in the reactor, the upper limit of the hydrogenation was reached at a throughput of 220 l./hr., when a hydrogenation temperature of 178° C. was kept.

*Example 4*

This example refers to the esterification of a fatty acid boiling at 180° C. with an alcohol boiling at about 200° C.

A tube of about 2.50 m. height and an open width of 65 mm. is fed with an acid synthetic resin exchanger of 3–4 mm. grain size. The jacket of this tube is heated according to the invention the temperature amounting to 160° C. at the lower and to 110° C. at the upper end of the tube. When the mixture to be esterified is let drop into the upper part of the tube and is continuously removed from the lower part, a practically complete esterification is obtained.

So high a conversion cannot be reached when using a conventional uniformly heated reactor since either the reaction would take a too rapid course in the upper part of the reactor, and decompositions would occur accordingly, when an elevated temperature were chosen, or an insufficient conversion would be obtained in case a lower temperature were applied for carrying out the reaction.

Since those chemical reactions to which the process according to the invention may be applied frequently take place within relatively narrow temperature ranges, it may be useful for the operation of such plants to maintain at an approximately even level once adjusted temperatures during the time of operation or during part of it. When applying e. g. liquids boiling under pressure, this can be reached suitably for example by keeping constant the pressure which is put on the boiling cooling medium. A simple means for doing this is offered by the possibility to adjust the condensation of the cooling medium vapors so that its intensity will remain about constant, i. e. the amount of cooling medium vapors condensing per unit of time will be kept about constant by controlling the inflow and the outflow of the cooling medium within the plant used for condensation of the vapors.

The terms "evaporating under rectifying conditions" means an evaporation such as achieved in a rectifying column wherein fractions of the liquid evaporated segregate at various levels of the column as, for example, in fractionating columns provided with filling materials, perforated plates or bubble caps.

What we claim is:

1. A process for the catalytic hydrogenation of carbon monoxide which comprises continuously passing the reaction gases downwardly through an extended reaction space containing a stationary catalyst and maintaining the reaction gases during their passage through the reaction space in indirect heat exchange relationship with a liquid disposed along said extended reaction space, said liquid having a substantial boiling point range and composed of a mixture of at least two components which in such mixture have different boiling points and continuously evaporating a portion of such liquid under rectifying conditions along said extended reaction space while in indirect heat exchange relationship with the reaction gases passing through said reaction space to maintain a difference between the boiling point of the liquid in the lower portion thereof and the boiling point of the liquid in the upper portion thereof greater than that produced by hydrostatic pressure in said liquid.

2. A process according to claim 1, in which the liquid consists of more than one organic chemical compound including water.

3. A process according to claim 1 which, in addition, comprises condensing the vapors produced and returning the condensate to the liquid.

4. A process according to claim 1 which, in addition, comprises condensing the vapors produced and returning the condensate to the top of the liquid.

5. A process in accordance with claim 1 in which the reacting materials are gases and the reaction space contains stationary catalyst bodies and said gases are passed through the reaction space at a sufficiently high velocity to cause turbulent flow of such gases through the reaction space.

6. A process in accordance with claim 1, comprising in addition continuously withdrawing vapors produced by the boiling liquid from above the surface of the liquid, introducing fresh liquid below the surface of the liquid and continuously withdrawing liquid enriched in higher boiling components from the lower part of the liquid.

7. A process in accordance with claim 1, in which said liquid has a boiling point range of over 100° C.

8. A process for the catalytic hydrogenation of carbon monoxide which comprises continuously passing the reaction gases downwardly through an extended reaction space containing a stationary catalyst and maintaining the reaction gases during their passage through the reaction space in indirect heat exchange relationship with a liquid disposed along said extended reaction space, said liquid having a substantial boiling point range and composed of a mixture of at least two components which in such mixture have different boiling points and continuously evaporating a portion of such liquid under rectifying conditions along said extended reaction space while in indirect heat exchange relationship with the reaction gases passing through said reaction space and while retarding vertical circulation of the liquid caused by the evaporation of the liquid to maintain a difference between the boiling point of the liquid in the lower portion thereof and the boiling point of the liquid in the upper portion thereof greater than that produced by hydrostatic pressure in said liquid.

9. A process for the catalytic hydrogenation of carbon monoxide which comprises continuously passing the reaction gases downwardly through an extended reaction space containing a stationary catalyst and maintaining the reaction gases during their passage through the reaction space in indirect heat exchange realtionship with a liquid disposed along said extended reaction space, said liquid having a substantial boiling point range and composed of a mixture of at least two components which in such mixture have different boiling points and continuously evaporating a portion of such liquid under rectifying conditions along said extended reaction space while in indirect heat exchange relationship with the reaction gases passing through said reaction space and repeatedly throttling the vapors rising within the boiling liquid to maintain a difference between the boiling point of the liquid in the lower portion thereof and the boiling point of the liquid in the upper portion thereof greater than that produced by hydrostatic pressure in said liquid.

10. A process for the catalytic hydrogenation of carbon monoxide which comprises continuously passing the reaction gases downwardly through an extended reaction space containing a stationary catalyst, continuously passing a boiling liquid under pressure upwardly along the reaction space in indirect heat exchange relationship with the reaction gas passing downwardly through said space, repeatedly constricting the flow of such boiling liquid along the reaction space whereby the pressure of said liquid is diminished in stages during such passage and boils at temperatures which diminish along the reaction space.

11. A process in accordance with claim 10, in which said liquid has a substantial boiling point range and is composed of a mixture of at least two components which in such mixture have different boiling points.

12. A process in accordance with claim 10 in which the reacting materials are gases and the reaction space contains stationary catalyst bodies and said gases are passed through the reaction space at a sufficiently high velocity to cause turbulent flow of such gases through the reaction space.

13. A process for the catalytic hydrogenation of carbon monoxide which comprises continuously passing the reaction gases downwardly through an extended reaction space containing a stationary catalyst arranged in upright layers maintaining a boiling liquid along said layers out of contact with said reaction gases but in indirect heat exchange relationship therewith, said liquid having a substantial boiling point range and being composed of a mixture of at least two components which in such mixture have different boiling points retarding vertical circulation of such boiling liquid along said layers caused by the boiling of said liquid to maintain a difference between the boiling point in the lower portion thereof and the boiling point in the upper portion thereof greater than that produced by hydrostatic pressure in said liquid.

OSKAR DORSCHNER.
WILHELM WENZEL.
HANS GEORG KAYSER.

References Cited in the file of this patent

UNITED STATES PATENTS

| Number | Name | Date |
|---|---|---|
| 1,459,024 | Hartburg | Jan. 19, 1923 |
| 1,666,251 | Andrews | Apr. 17, 1923 |
| 1,743,989 | Wainwright | Jan. 14, 1930 |
| 1,770,208 | Kemnal | July 8, 1930 |
| 1,834,679 | Cannon | Dec. 1, 1931 |
| 1,850,797 | Jaeger | Mar. 22, 1932 |
| 1,900,715 | Jaeger | Mar. 7, 1933 |
| 1,917,716 | Jaeger | July 11, 1933 |
| 1,917,718 | Jewett | July 11, 1933 |
| 1,935,053 | Jaeger | Nov. 14, 1933 |
| 2,098,148 | Jarl | Nov. 2, 1937 |
| 2,120,538 | Andrews | June 14, 1938 |
| 2,209,346 | McCausland | July 30, 1940 |
| 2,353,600 | Sweetser | July 11, 1944 |
| 2,450,500 | Clark | Oct. 5, 1948 |
| 2,463,912 | Scharmann | Mar. 8, 1949 |
| 2,464,505 | Hemminger | Mar. 15, 1949 |
| 2,481,089 | Dickinson | Sept. 6, 1949 |

FOREIGN PATENTS

| Number | Country | Date |
|---|---|---|
| 103,051 | Australia | Jan. 24, 1933 |
| 509,105 | Great Britain | July 11, 1939 |